United States Patent
Sweet et al.

(10) Patent No.: US 8,493,612 B2
(45) Date of Patent: Jul. 23, 2013

(54) PREDICTING AN EXPANSION DIFFICULTY AND AN EXPANSION TIME REQUIRED TO PERFORM A RENDERING OPERATION

(75) Inventors: James M. Sweet, Rochester, NY (US); William E. Nelson, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 847 days.

(21) Appl. No.: 12/696,194

(22) Filed: Jan. 29, 2010

(65) Prior Publication Data

US 2011/0188062 A1     Aug. 4, 2011

(51) Int. Cl.
*G06K 15/02* (2006.01)

(52) U.S. Cl.
USPC .......... 358/1.2; 358/1.9; 358/1.13; 358/1.15; 358/1.18; 358/426.02; 382/166; 382/232; 382/239; 382/240; 382/243

(58) Field of Classification Search
None
See application file for complete search history.

(56) References Cited

U.S. PATENT DOCUMENTS

| | | | |
|---|---|---|---|
| 6,330,363 B1 * | 12/2001 | Accad | 382/232 |
| 6,650,261 B2 | 11/2003 | Nelson et al. | 341/106 |
| 6,661,925 B1 * | 12/2003 | Pianykh et al. | 382/239 |
| 6,731,814 B2 | 5/2004 | Zeck et al. | 382/239 |
| 6,804,401 B2 | 10/2004 | Nelson et al. | 382/239 |
| 2003/0002056 A1 * | 1/2003 | Yamaguchi et al. | 358/1.2 |

* cited by examiner

*Primary Examiner* — Miya J Cato
(74) *Attorney, Agent, or Firm* — Kermit D. Lopez; Luis M. Ortiz; Ortiz & Lopez, PLLC

(57) ABSTRACT

A method and system for predicting expansion difficulty and an expansion time required to perform print-time imaging operations. A print-ready compressed file may be generated by raster image processing of a job description file associated with a rendering job provided by a digital front end. The expansion time with respect to one or more expansion processes may be predicted by a linear equation during assembly of the compressed file. The linear equation may be formulated based on measured compression statistics that relate to profile data within the compressed file. The total expansion time with respect to the rendering job may be then computed by summing the results of the linear equations. The expansion time to perform the print-time imaging operations may be compared with an available time based on an image output terminal speed to improve performance of raster image processing.

19 Claims, 3 Drawing Sheets

PREDICTING AN EXPANSION DIFFICULTY AND AN EXPANSION TIME REQUIRED TO PERFORM A RENDERING OPERATION

TECHNICAL FIELD

Embodiments are generally related to rendering devices, such as printers, scanners, multi-function devices, photocopy machines, and the like. Embodiments are also related to RIP (Raster Image Processing) for the rapid generation of images and other data. Embodiments are additionally related to techniques for improving the performance of raster image processing.

BACKGROUND OF THE INVENTION

Digital rendering devices such as printers typically rely on raster image processing for generating digital images (e.g., contone byte map) based on a compact input representation such as, for example, a PDL (Page Description Language) file. A DFE (Digital Front End) then processes an incoming rendering job in the form of the PDL file to create a print-ready rasterized image. The rasterized image may be then fed to a print engine for image rendering via paper or other printable media. The majority of processing cycles associated with the DFE may be consumed during the RIP operations. The processing time to rasterize the data and transfer the data to the print engine may slow the ability of the print engine to render data at a full-rated speed.

A prior art technique for improving RIP performance of a rendering job employs cached reusable objects to create a print-ready image (e.g., a compressed image). Such a print-ready image may include any number of independent JPEG tiles, which are generally expanded and assembled at the time of rendering. The JPEG tiles may overlap one another, resulting in the print-time expansion of data, which may subsequently be discarded. Consequently, an unbounded number of assembly operations are deferred from RIP-time until print-time. Such an approach, however, can result in a broken and/or a blank page as the print-time expansion and assembly operations are not completed based on an IOT (Image Output Terminal) speed. Additionally, the rendering system may not be able to operate in "real-time" and hence it is difficult to process and render extremely large amounts of data via such an approach.

Based on the foregoing, it is believed that a need exists for an improved system and method for predicting expansion difficulty and the expansion time required to perform print-time imaging operations. A need also exists for formulating a linear equation based on measured compression statistics for use in rendering operations, as described in greater detail herein.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved method and system for managing rendering devices, such as printers, scanners, multi-function devices, photocopy machines, and the like.

It is another aspect of the disclosed embodiments to provide for an improved method and system for predicting the expansion difficulty and the expansion time required to perform a print-time imaging operation.

It is a further aspect of the disclosed embodiments to provide for an improved method and system for formulating a linear equation based on measured compression statistics for use in rendering operations.

The aforementioned aspects and other objectives and advantages can now be achieved as described herein. Note that as utilized herein, the term "expansion" also refers to the decompression of data-compressed image data and/or other information. Methods and systems for predicting the expansion difficulty and the expansion time required to perform a print-time imaging operation are disclosed. A print-ready compressed file may be generated by RIP of a job description file associated with a rendering job provided by a DFE. The expansion time with respect to one or more expansion processes (e.g., JPEG, RLC decode, etc) may be predicted utilizing a linear equation during assembly of the compressed file. Such a linear equation may be computed based on measured compression statistics that relate to profile data within the compressed file that are weighted based on coefficients determined a priori. Top-level expansion logic may be performed to select the relevant linear equation (s) based on a determination of which expansion processes will be performed. The total expansion time associated with the rendering job may be then computed by summing the results of the linear equations.

The expansion time to perform the print-time imaging operation may be compared with an available time based on IOT speed to improve net RIP performance by deferring some operations to print-time imaging operations. The expansion time required for the expansion of the compressed file may be predicted during assembly of the compressed file, and the compressed file may be simplified by performing additional RIP-time operations. Compressed page images may be expanded in "real time" based on the expansion time. Such an expansion difficulty prediction approach may be employed to determine whether a real-time requirement is achieved with respect to the imaging operations based on the expansion time and thereby improve the efficiency of rendering operations.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

Figure 1:
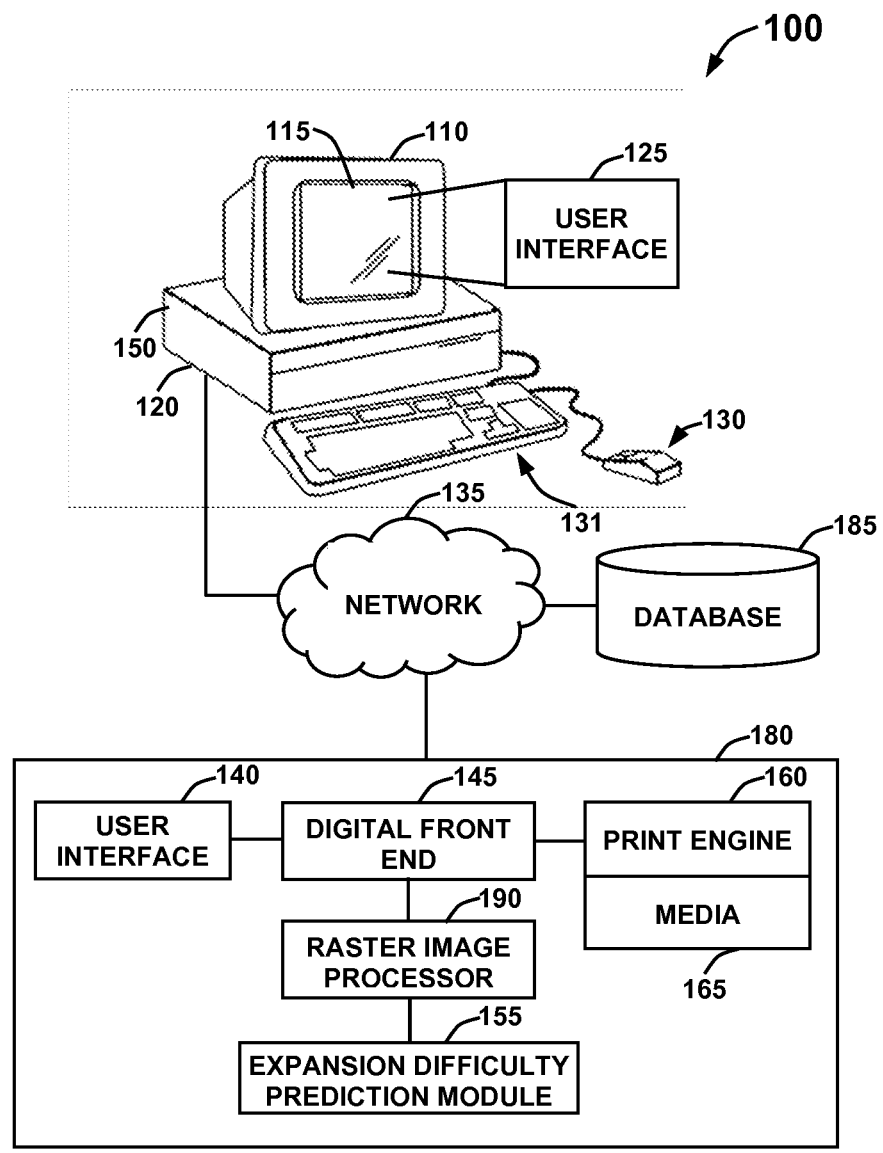
FIG. 1 illustrates an example of a rendering device coupled to a data-processing system through a network, in accordance with the disclosed embodiments.

FIG. 1 is provided as an exemplary diagram of data processing environments in which embodiments of the present invention may be implemented. It should be appreciated that FIG. 1 is only exemplary and is not intended to assert or imply any limitation with regard to the environments in which aspects or embodiments of the present invention may be implemented. Many modifications to the depicted environments may be made without departing from the spirit and scope of the disclosed embodiments.

FIG. 1 depicts a system 100 that includes a rendering device 180 coupled to a data-processing system 110 through a network 135. The data-processing system 110 may be, for example, a computing device such as, for example, personal computer, a server, a computer workstation, a laptop computer or another computing apparatus or system (e.g., wireless cellular telephone, Smartphone, etc), and generally includes a central processor 120, a display device 115, a keyboard 131, and a pointing device 130 (e.g., mouse, track ball, pen device, or the like). Additional input/output devices, such as the rendering device 180, may be included in association with the data-processing system 110 as desired.

Note that as utilized herein, the term rendering device may refer to an apparatus and/or system such as a printer, scanner, fax machine, copy machine, etc., and/or a combination thereof. Preferably, rendering device 180 is capable of multiple rendering functions such as printing, copying, scanning, faxing, etc. In some embodiments, rendering device 180 may be implemented with a single rendering function such as printing. In other embodiments, rendering device 180 can be configured to provide multiple rendering functions, such as scanning, faxing, printing and copying.

The data-processing system 110 can communicate with the rendering device 180 through, for example, a computer network 135 or other networking configuration. Network 135 may employ any network topology, transmission medium, or network protocol, such as, for example, Ethernet, Internet, Intranet, etc. Network 135 may include connections, such as wired links, wireless communication links, fiber optic cables, USB components, and so forth. The data-processing system 110 can include a GUI 125 that displays information and receives data through device display and/or the keyboard/mouse combination. The GUI 125 also serves to display results, whereupon the user may supply additional inputs or terminate a given session.

A rendering device driver program may be installed at the data-processing system 110 and may reside on a hard drive 150 of a host device. The rendering device driver program may be activated through an application interface so that a user may generate a rendering job with an MFD driver for processing via the rendering device 180. The rendering device 180 can be configured to include a GUI 140, a Digital Front End (DFE) component 145, and a print engine 160.

Note that the term digital front end or DFE as discussed herein generally refers to the central management component of the digital printing system of rendering device 180. The DFE component 145 is capable of loading files from various network sources associated with network 135 and process the files so they can be output on various digital equipment, whether it be a small desktop printer or a large digital press. The DFE component 145, in most cases, is a powerful unit that accepts and processes files for variable data applications and also pulls information from a database 185 for more personalized documents. The DFE component 145 provides consistency in color, quality, and accuracy, assuring print providers and customers that projects will be of the highest standards at all times.

The DFE component 145 further includes an RIP component or RIP processor 190 for generating, for example, a contone byte map, of an image to be rendered. The processor 190 can generate, for example, contone byte map images from a PDL stream. Recall previously that the acronym PDL refers to "Page Description Language," which is a language that generally describes the appearance of a rendered page. The GUI 140 associated with the rendering device 180 may include, for example, a graphically displayed panel menu that provides various input and selection features to permit the input of data to the rendering device 180. Such a GUI may include, for example, a touch screen having touch activated keys for navigating through a graphically displayed option menu or the like.

The DFE 145 can access an expansion difficulty prediction module 155 configured for predicting expansion difficulty and the expansion time required to perform print-time imaging operations. Such a module is typically implemented in the context of a software application, and/or modules (e.g., hardware and/or software) that enable image processing and control functions such as those described herein with respect to FIGS. 2-3. It can be appreciated that the prediction module 155 can also be accessed through a pre-press system.

Note that as utilized herein, the term "module" may refer to a physical hardware component and/or to a software module. In the computer programming arts, such a software "module" may be implemented as a collection of routines and data structures that performs particular tasks or implements a particular abstract data type. Modules of this type are generally composed of two parts. First, a software module may list the constants, data types, variable, routines, and so forth that can be accessed by other modules or routines. Second, a software module may be configured as an implementation, which can be private (i.e., accessible only to the module), and which contains the source code that actually implements the routines or subroutines upon which the module is based.

Therefore, when referring to a "module" herein, the inventors are generally referring to such software modules or implementations thereof. The methodology described herein can be implemented as a series of such modules or as a single software module. Such modules can be utilized separately or together to form a program product that can be implemented through signal-bearing media, including transmission media and recordable media. Embodiments are capable of being distributed as a program product in a variety of forms, which apply equally regardless of the particular type of signal-bearing media utilized to carry out the distribution.

Examples of signal-bearing media can include, for example, recordable-type media, such as floppy disks, hard disk drives, CD ROMs, CD-Rs, etc., and transmission media, such as digital and/or analog communication links. Examples of transmission media can also include devices such as modems, which permit information to be transmitted over standard telephone lines and/or the more advanced digital communications lines.

The print engine 160 can access media 165 of various size and cost. A user can operate the rendering device 180 utilizing the GUI 140 and/or via the data-processing system 110. A user profile, work product for printing, media library, print job parameters and so forth can be stored in a database 185, which is accessible by the data-processing system 110 or rendering device 180 via the network 135, or which can be directly accessed via the rendering device 180. The GUI 140 can be used to communicate particular rendering device features for processing a rendering job to a user and accepting the user's selection of available rendering device features. The GUI 140 also serves to display results, whereupon the user may supply additional inputs or terminate a given session.

Note that the disclosed embodiments may be embodied in the context of a data-processing apparatus and/or rendering device, such as, for example, the data-processing system 110 and rendering device 180 depicted in FIG. 1. It can be appreciated, however, that the disclosed embodiments are not limited to any particular application or any particular environment. Instead, those skilled in the art will find that the disclosed embodiments may be advantageously applied to a variety of systems and software applications. Moreover, the disclosed embodiments may be embodied in a variety of different platforms, including but not limited to, for example, Macintosh, UNIX, LINUX, and the like. Therefore, the description of the exemplary embodiments, which follows, is for purposes of illustration and is not considered a limitation.

Figure 2:
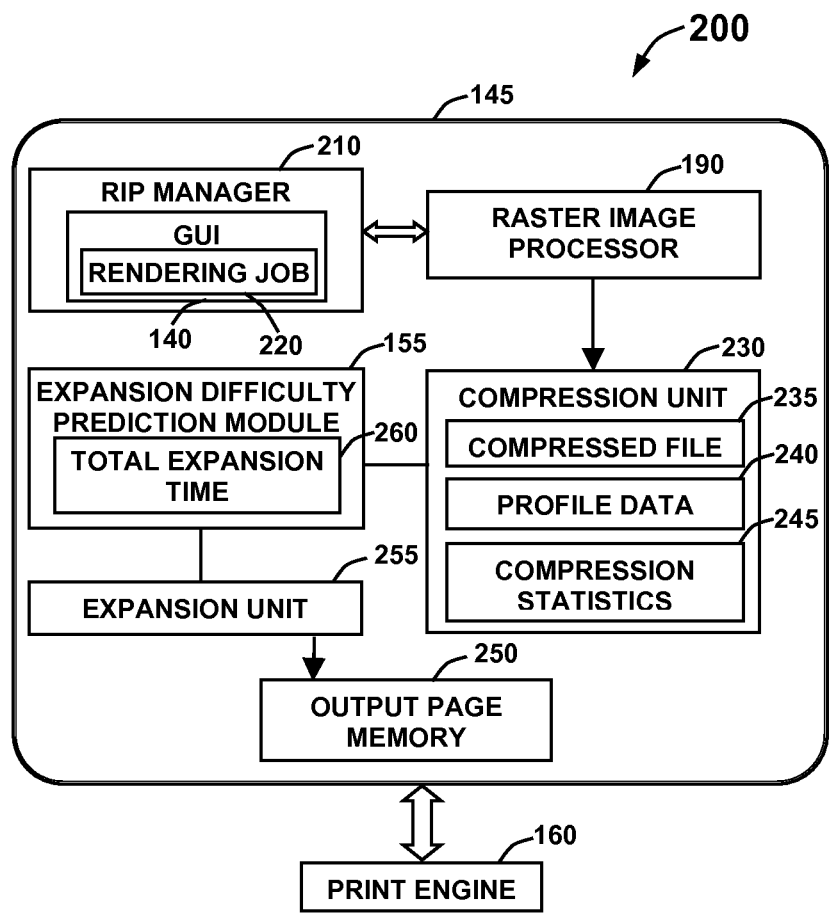
FIG. 2 illustrates a block diagram of a real-time image expansion system for predicting the expansion time required to perform print-time imaging operations, in accordance with the disclosed embodiments.

FIG. 2 illustrates a block diagram of a real-time image expansion system 200 for predicting the expansion time required to perform print-time imaging operations, in accordance with the disclosed embodiments. Note that in FIGS. 1-3, identical or similar blocks are generally indicated by identical reference numerals. The system 200 includes DFE 145 to receive a rendering job 220 from submission clients over network 135 for rendering via an output device, such as, for example, the print engine 160. The DFE 145 in association with the processor 190 (i.e., an RIP Processor) performs raster image processing of a job description file associated with the rendering job 220, in order to generate, for example, a contone byte map, for rendering via the print engine 160, among other functions. The DFE 145 may also create and manage print queues and the print engine 160, and additionally provide byte map data to the print engine 160.

The processor 190 may composed of software, hardware and/or firmware that creates an image in a computer memory based on the job description file. Note that the job description file may be a PDL file that generally includes commands for setting various printing environments. The PDL may include various printing parameters for designating a line width, line type, line end shape processing method, font type, size, decoration (bold/italic), enlargement/reduction, rotational angle, drawing logic (e.g., AND, OR, NAND, NOR, etc.), clipping area and so forth. More particularly, the processor 190 rasterizes variable combinations of text, graphics and continuous tone images at high speed based on the job description file input, and then outputs the rasterized image in a digital form to the print engine 160 in real time synchronism with the operations of the print engine 160.

An RIP manager 210, which communicates with the processor 190, includes GUI 140. In general, GUI 140 includes and graphically displays a GUI input mechanism, for example, in the form of a check box or radio button, which permits users to enable or disable the processor 190 from receiving and/or sending commands and data from entities other than the RIP manager 210. The interface 140 may also include one or more inputs (or input regions) for enabling automatic job acceptance and for setting or selecting automatic job-acceptance criteria, such as job size, job types, and job numbers. The print engine 160 generally performs print imaging (rendering) operations and fixing and paper transport for the rendering of output images corresponding to byte map data. The output images may be transported to an output tray or stacker (not shown).

The front end 210 supplies the job description file associated with the rendering job 220 to the processor 190. A compression process may be then applied to the byte map data by a compression unit 230 to generate a compressed file 235 in the DFE 145. A total expansion time 260 with respect to one or more expansion process (e.g., RLC decode, JPEG Huffman decode, JPEG IDCT, TBIt, etc.) may be predicted utilizing a linear equation. Such linear equation may be computed based on measured compression statistics 245 that relate to the profile data 240 within the compressed file 235, and that are weighted based on coefficients determined a priori. Note that the compressed file 235 may be for example, an XM2.4 file. Top-level expansion logic may be performed to select the relevant linear equations based on a determination of which expansion processes will be performed. For example, the expansion time for a single scanline or 8-scanline strip of an expansion process can be defined as shown in equation (1) below:

$$y = b + m_1 x_1 + m_2 x_2 + \ldots m_n x_n \qquad (1)$$

Note that in equation (1) above, the variable y represents the predicted expansion time for a single iteration associated with the expansion process; each of the $x_i$ input variables represents one of the measured compression statistics. The variables b and each $m_i$ are constants. The total expansion time 260 for a page may be then computed by summing the results of the relevant linear equations to improve performance of raster image processor 190.

The compressed file 235 may include one RLC (Run-Length Coded) component. The expansion of the RLC component (e.g., RLC decode) may be modeled on a per-scanline basis. The compression statistics 245 may be computed for each scanline associated with the RLC data. For example, the number of bytes in the scanline may be inferred from the image dimensions, which require no storage. The number of opaque bytes in the scanline includes both opaque pixels and background pixels, since both require a write to memory at the expansion time. This may be stored in a separate compression statistics structure. The number of distinct runs in the scanline may also be stored in a separate compression statistics structure.

The compressed file 235 may also include one or more JPEG-compressed lower plane components. The expansion of each JPEG component (e.g., JPEG Huffman Decode) may be modeled on a per-strip (8-scanline) basis. The compression statistics 245 may be computed for each strip of the JPEG Huffman decode. For example, the number of 8×8 blocks in the strip may be inferred from the dimensions of the JPEG component, which require no storage. The number of non-zero AC terms in the strip may be stored in a separate compression statistics structure associated with each JPEG tile.

The compressed file 235 may include one or more JPEG-compressed lower plane components (e.g., JPEG IDCT). The expansion of each JPEG component may be modeled on a per-strip (8-scanline) basis. The OCT (Image Discrete Cosine Transform) step may be modeled separately from the Huffman Decode step. The compression statistics 245 may be computed for each strip of the JPEG IDCT. For example, the number of 8×8 blocks in the strip may be inferred from the dimensions of the JPEG component, so there is no need to store it separately. The number of non-solid 8×8 blocks in the strip in other words, the number of 8×8 blocks with a constant value, or the number of 8×8 blocks with no non-zero AC terms may be stored in a separate compression statistics structure associated with each JPEG tile.

The compressed file 235 may include one or more lower plane components with an accompanying run-mask selector. The TBIt associated with each lower plane component may be modeled on a per-scanline basis. For example, the number of bytes in the scanline can be inferred from the dimensions of the lower plane component, so there is no need to store it separately. The number of opaque bytes specified in the selector scanline may be stored in a separate compression statistics structure associated with each lower plane component. The number of distinct runs in the selector scanline may be stored in a separate compression statistics structure associated with each lower plane component. Note that "TBIt" refers generally to the merging of multiple planes of compressed information and/or compressed images with a mask to select between a canvas and an image.

The total expansion time 260 to perform the print-time imaging operations may be compared with an available time based on an image output terminal speed. The expansion time 260 required for the expansion of the compressed file 235 may be predicted during assembly of the compressed file 235 via the linear equation and the compressed file 235 may be simplified by performing additional RIP-time operations. Note that the measured compression statistics described herein are sufficient to calculate a reasonable difficulty estimate for a wide range of implementations.

The compressed file 235 may be transmitted from the DFE 145 to an expansion unit 255. In the expansion unit 255, the compressed file 235 may be decompressed in real time based on the expansion time to generate byte map data substantially equivalent to the uncompressed byte map data. The byte map data from an output page memory 250 may be provided to the print engine 160, where an image based on the byte map data is outputted.

Figure 3:
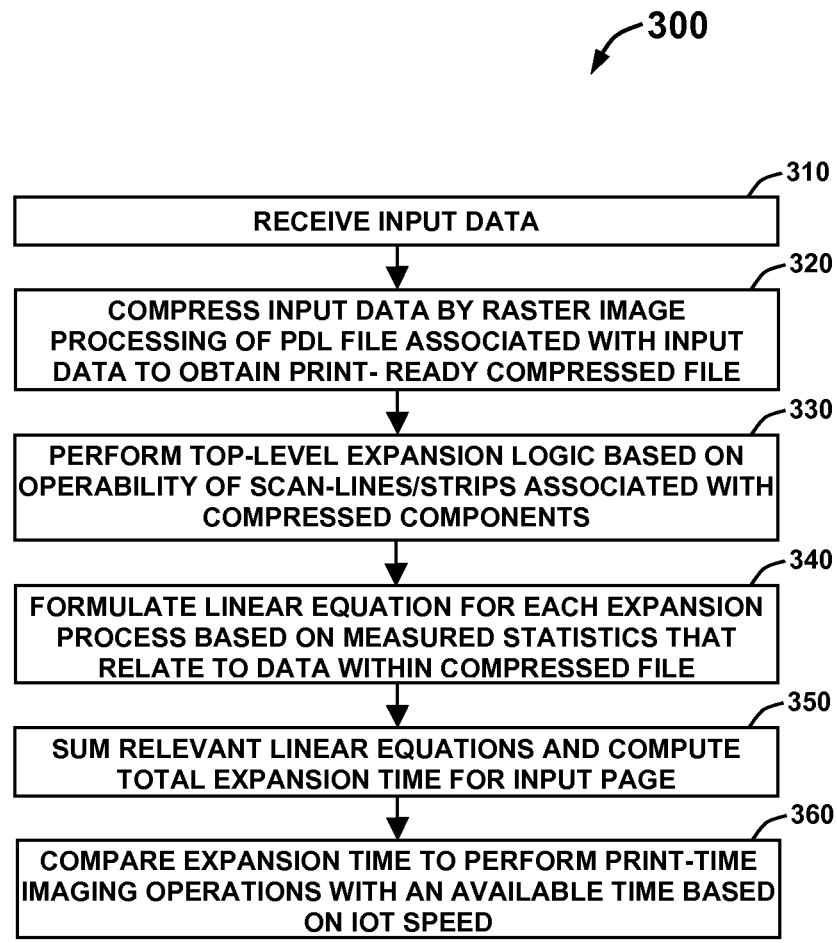
FIG. 3 illustrates a high level flow chart of operations illustrating logical operational steps of a method for predicting the expansion difficulty and the expansion time required to perform print-time imaging operations, in accordance with the disclosed embodiments.

FIG. 3 illustrates a high level flow chart of operations illustrating logical operational steps of a method 300 for predicting expansion difficulty and an expansion time required to perform print-time imaging operations, in accordance with the disclosed embodiments. Note that the method 300 can be implemented in the context of a computer-useable medium that contains a program product. The method 300 depicted in FIG. 3 can also be implemented in a computer-usable medium containing a program product.

The input data 220 may be received, as illustrated at block 310. The input data 220 may be compressed by raster image processing of a PDL file associated with the input data 220 to obtain the print-ready compressed file 235, as indicated at block 320. The top-level expansion logic may be performed to select relevant linear equations based on a determination of which expansion processes will be performed, as depicted at block 330. The linear equation for each expansion process can be computed based on the measured statistics that relate to the profile data 240 within the compressed file 235, as illustrated at block 340. The relevant linear equations can be summed and the total expansion time 260 for the input page 220 may be computed, as indicated at block 350. The expansion time 260 may then be compared to perform the print-time imaging operations with an available time based on IOT speed, as illustrated at block 360. The compressed page images can be expanded in real time based on the expansion time. Such an expansion difficulty prediction approach may be employed to determine whether a real-time requirement is achieved with respect to the imaging operations based on the expansion time.

The difficulty prediction algorithm described in the embodiment requires a statistical model of expansion performance, with weighting coefficients determined a priori. Generation of the statistical model requires a well-varied data set, and typically requires specialized skills to interpret it.

An automated algorithm may be implemented for deriving the difficulty prediction model. When the algorithm is run on a target platform, the output is the statistical model of the difficulty prediction for that particular platform.

The expansion time for a single scanline or 8-scanline strip of an expansion process can be defined as shown in equation (2) below:

$$y = b + m_1 m_2 + m_2 x_2 + \ldots m_n x_n \qquad (2)$$

Note that in equation (2) above, the variable y represents the predicted expansion time for a single iteration associated with the expansion process; each of the $x_i$ input variables represents one of the measured compression statistics. The variables b and each $m_i$ are constants, which must be generated a priori.

The constants b and $m_i$ are dependent upon the expansion implementation and expansion platform, and will vary for each new implementation or configuration. Said constants may be automatically derived by employing linear regression analysis on a data set consisting of the expansion times for a large number of scanlines/strips representing a wide distribution of measured compression statistics.

Linear regression analysis is a means of generating a linear model of the relationship between a dependent variable y and a set of independent variables X, with said model consisting of a set of regression coefficients β. Several linear regression analysis techniques (e.g. Singular Value Decomposition, or SVD) can be easily performed by a data-processing module (e.g. a software application), and will be well-known to those skilled in the art.

A chosen linear regression analysis technique (e.g. SVD) may be used to develop a difficulty expansion model in which the dependent variable y represents the measured expansion time for a single iteration associated with the expansion process, he independent variables X represent the measured compression statistics for the compressed scanline/strip associated with that iteration, and the resulting regression coefficients β represent the required a priori constants b and $m_i$ in equation (2).

Linear regression analysis requires good coverage of the expected range of all independent variables X in order to generate sufficiently predictive regression coefficients β. In the preferred embodiment, the experimental data set providing the inputs to the linear regression analysis includes data points ranging from the minimum to maximum expected values of each of the compression statistics associated with a given expansion process, with the distribution across this input space being as uniform as possible.

Compression of randomly generated data typically does not satisfy the criteria of independent distribution of compression statistics, as correlations may exist between two or more compression statistics. For example, in RLC-compressed random data, the number of distinct runs in a given scanline will have a positive correlation with the number of pixels in said scanline.

The compressed data representing the inputs y and X to the linear regression analysis may be derived from practical field data, i.e. compressed data generated from stock PDL documents. Confounding correlations between independent variables are reduced, but may still exist if the practical field data used is not a representative sample of the entire population of PDL documents.

In the preferred embodiment, the compressed data representing the inputs y and X to the linear regression analysis are derived from compressed data which has been artificially generated by algorithms which seeks to maximize the range and uniformity of distribution of the measured compression statistics (hereafter known as "well-distributed compressed data"). These algorithm(s) may be implemented in a data processing module (e.g. a software application).

The disclosed algorithm(s) for deriving well-distributed compressed data may control the compression statistics directly. For example, in the case of RLC data, the algorithm may accept as inputs a predetermined specific number of total pixels, a predetermined specific number of distinct runs, and a predetermined specific number of opaque pixels. The algorithm then iteratively generates runs with a length and opacity chosen from a random distribution determined by the average number of total pixels and opaque pixels remaining in the scanline.

The disclosed algorithm(s) for deriving well-distributed compressed data may attempt to influence the compression statistics indirectly. For example, in the case of JPEG data, it may not be practical to control the number of AC terms in each 8-pixel-by-8-pixel block directly. said the disclosed algorithm may instead set aside some portion of each block where each pixel has a constant value, with the remainder of each block containing pixels of with a random value. Varying the proportion of the block which is constant vs. random has a correlative effect on the number of AC terms, and may be used to indirectly control the number of AC terms in each 8-pixel-by-8-pixel block. Note that the disclosed embodiments may also involve the implementation of an algorithm to detect a poor fit or other common anomalies in the derived model, and either re-run the simulation or alert the operator to a problem with the derived model.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A computer-implemented method, said method comprising:
   computing via a processor a linear equation for an expansion process based on at least one measured compression statistic that relates to profile data within a compressed file associated with a rendering job during assembly of said compressed file, by executing a program instruction in a data-processing system comprising said processor; and
   summing via a processor results associated with said linear equation in order to predict an expansion difficulty and an expansion time required to perform at least one print-time imaging operation to thereby improve performance and efficiency of a raster image processor in real-time, by executing a program instruction in a data-processing system comprising said processor, wherein said linear equation comprises coefficients, wherein said coefficients utilized in said linear equation are generated by a linear regression analysis with respect to a set of experimental data.

2. The computer-implemented method of claim 1 further comprising comparing said expansion time to perform said at least one print-time imaging operation with an available time based on speed of an image output terminal, by executing a program instruction in a data-processing system.

3. The computer-implemented method of claim 1 further comprising generating said compressed file by raster image processing of a PDL file associated with said rendering job provided by a digital front end, by executing a program instruction in a data-processing system.

4. The computer-implemented method of claim 1 further comprising processing a top-level expansion logic to determine said linear equation based on a plurality of scanlines and strips associated with a compressed component, by executing a program instruction in a data-processing system.

5. The computer-implemented method of claim 1 wherein said at least one print-time imaging operation further comprises expanding said compressed file in real time based on said expansion time, by executing a program instruction in a data-processing system.

6. The computer-implemented method of claim 1 wherein said compressed file comprises at least one RLC component and wherein said at least one measured compression statistic includes at least one of the following parameters: a number of bytes in a scanline; a number of opaque bytes in said scanline; a number of distinct runs in said scanline.

7. The computer-implemented method of claim 1 wherein said compressed file comprises at least one JPEG-compressed component and wherein said at least one measured compression statistic includes at least one of the following parameters: a number of $8.\text{times}.8$ blocks inferred from dimensions of said PEG-compressed component; a number of non-zero AC terms; JPEG Huffman Decode; and a number of non-solid $8.\text{times}.8$ blocks.

8. The computer-implemented method of claim 1 further comprising determining whether a real-time requirement is achieved with respect to said at least one print-time imaging operation based on said expansion time, by executing a program instruction in a data-processing system.

9. The computer-implemented method of claim 1 wherein said expansion process comprises at least one of the following types of processes: a RLC decode; a JPEG Huffman decode; a JPEG inverse discrete cosine transform process; and a TBIt process.

10. The computer-implemented method of claim 1 wherein said linear regression analysis utilizes:
    as a dependent variable, a measured expansion time of one iteration of an expansion process;
    as independent variables, measured compression statistics associated with one scanline/strip of compressed data; and
    as regression coefficients, said coefficients used in said linear equation.

11. The computer-implemented method of claim 1 further comprising artificially generating said experimental data utilizing an algorithm that maximizes a uniform distribution of independent variables, by executing a program instruction in a data-processing system.

12. The computer-implemented method of claim 11 wherein said algorithm directly controls said independent variables.

13. The computer-implemented method of claim 11 wherein said algorithm indirectly controls said independent variables.

14. The computer-implemented method of claim 1 further comprising computing a metric representing a fitness of a derived model, by executing a program instruction in a data-processing system, wherein said metric is utilized to: inform an operator of an insufficiently fit model; or automatically regenerate a new model in the case said derived model comprises an insufficiently fit model.

15. A system, comprising:
    a processor;
    a data bus coupled to said processor; and
    a computer-usable medium embodying computer code, said computer-usable medium being coupled to said data bus, said computer program code comprising instructions executable by said processor and configured for:

computing a linear equation for an expansion process based on at least one measured compression statistic that relates to profile data within a compressed file associated with a rendering job during assembly of said compressed file; and summing results associated with said linear equation in order to predict an expansion difficulty and an expansion time required to perform at least one print-time imaging operation to thereby improve performance and efficiency of a raster image processor in real-time, wherein said linear equation comprises coefficients, wherein said coefficients utilized in said linear equation are generated by a linear regression analysis with respect to a set of experimental data.

16. The system of claim 15 wherein said instructions are further configured for comparing said expansion time to perform said at least one print-time imaging operation with an available time based on speed of an image output terminal.

17. The system of claim 15 wherein said instructions are further configured for generating said compressed file by raster image processing of a PDL file associated with said rendering job provided by a digital front end.

18. The system of claim 15 wherein said instructions are further configured for processing via said processor, a top-level expansion logic to determine said linear equation based on a plurality of scanlines and strips associated with a compressed component.

19. A computer-usable medium embodying computer program code, said computer program code comprising computer executable instructions configured for:

computing a linear equation for an expansion process based on at least one measured compression statistic that relates to profile data within a compressed file associated with a rendering job during assembly of said compressed file;

and summing results associated with said linear equation in order to predict an expansion difficulty and an expansion time required to perform at least one print-time imaging operation to thereby improve performance and efficiency of a raster image processor in real-time, wherein said linear equation comprises coefficients, wherein said coefficients utilized in said linear equation are generated by a linear regression analysis with respect to a set of experimental data.

* * * * *